(No Model.) 6 Sheets—Sheet 1.
M. T. CHAPMAN.
WINDING DRUM.
No. 371,548. Patented Oct. 18, 1887.
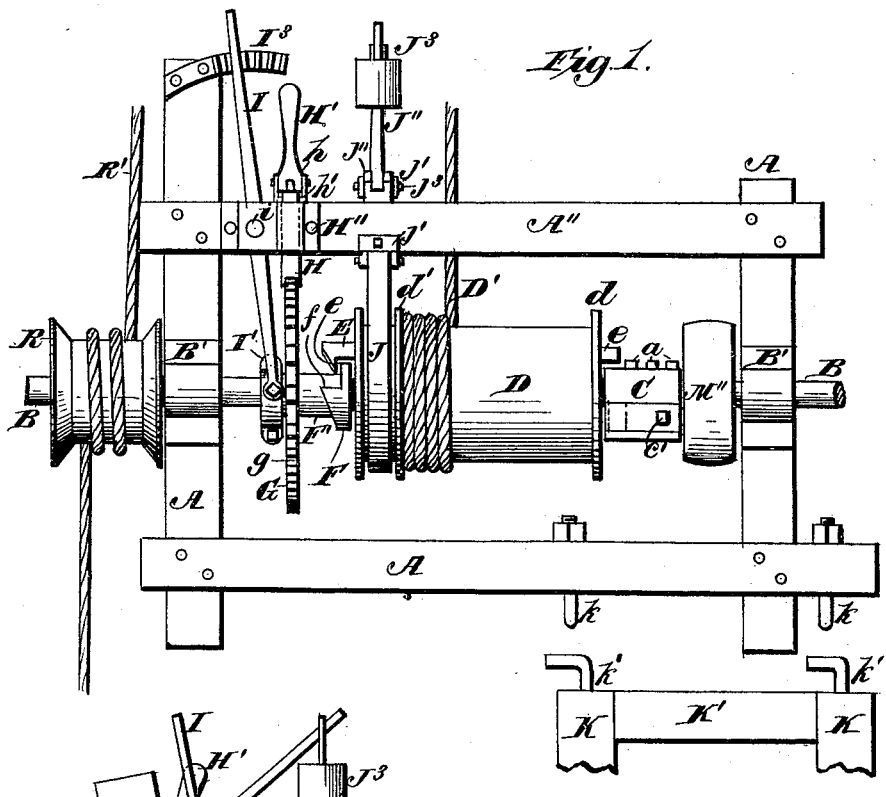
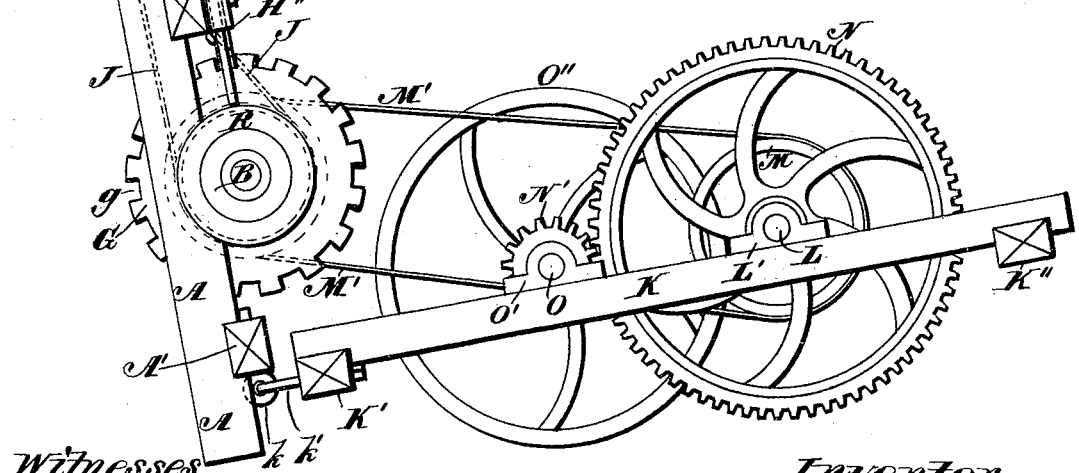
Witnesses.
Robt Everett
J. A. Rutherford
Inventor:
Matthew T. Chapman.
By West & Bond
Attys.

(No Model.) 6 Sheets—Sheet 2.
M. T. CHAPMAN.
WINDING DRUM.
No. 371,548. Patented Oct. 18, 1887.
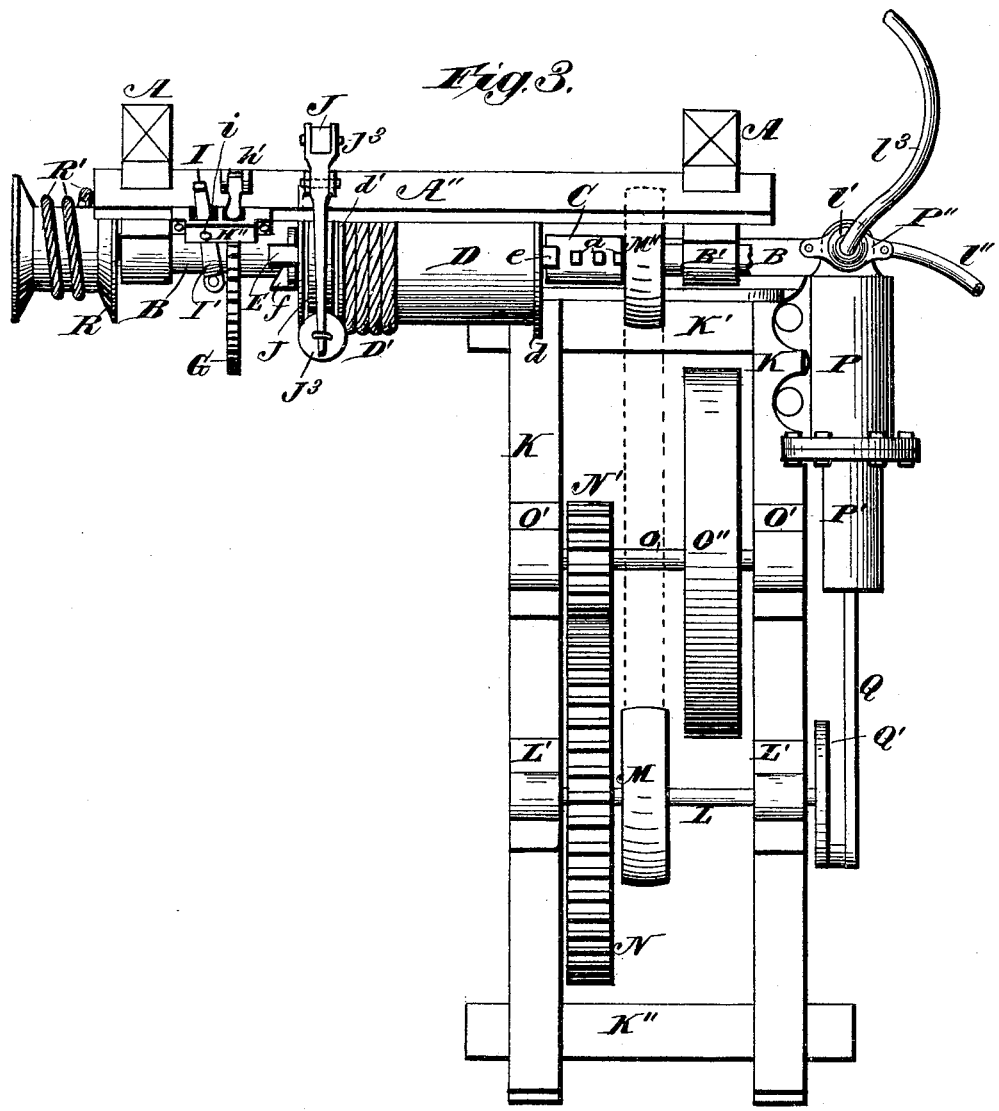
Witnesses.
Robert Errett
J. A. Rutherford
Inventor:
Matthew T. Chapman,
By West & Bond
Attys.

(No Model.) 6 Sheets—Sheet 3.
M. T. CHAPMAN.
WINDING DRUM.
No. 371,548. Patented Oct. 18, 1887.
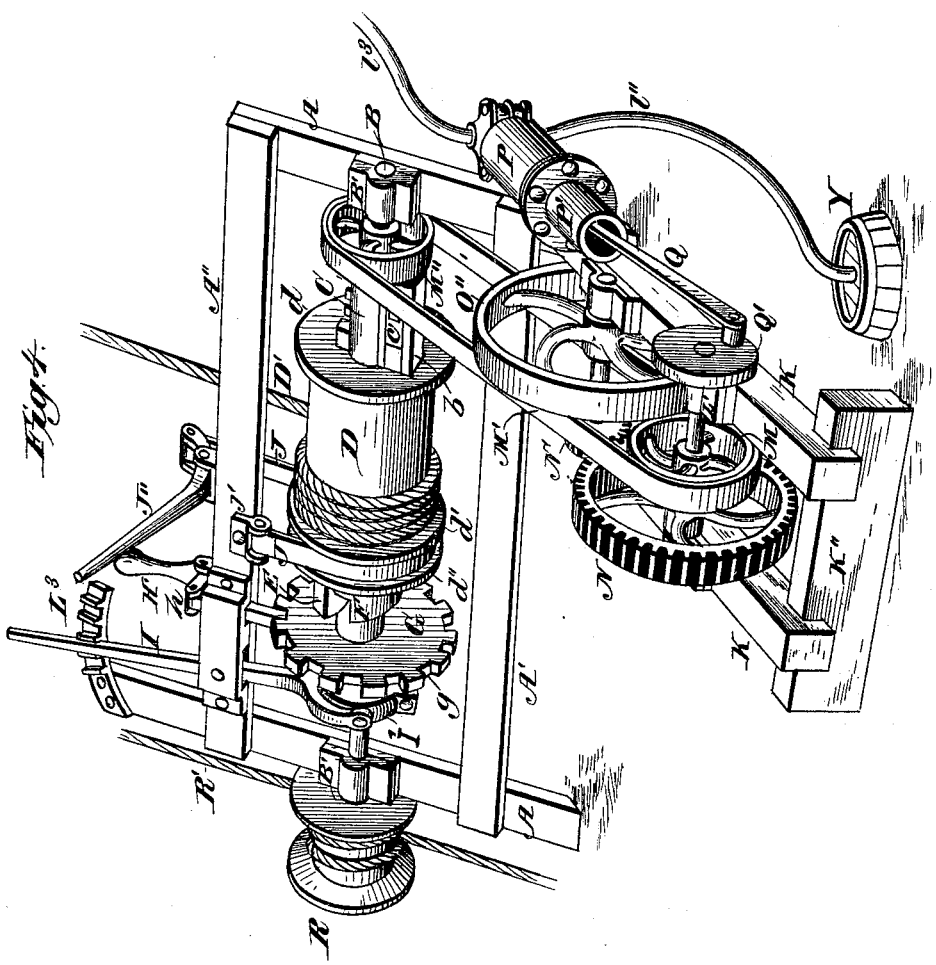
Witnesses.
Robert Everett,
J. A. Rutherford.
Inventor.
Matthew T. Chapman.
By West & Bond
Attys (No Model.) 6 Sheets—Sheet 4.
M. T. CHAPMAN.
WINDING DRUM.
No. 371,548. Patented Oct. 18, 1887.
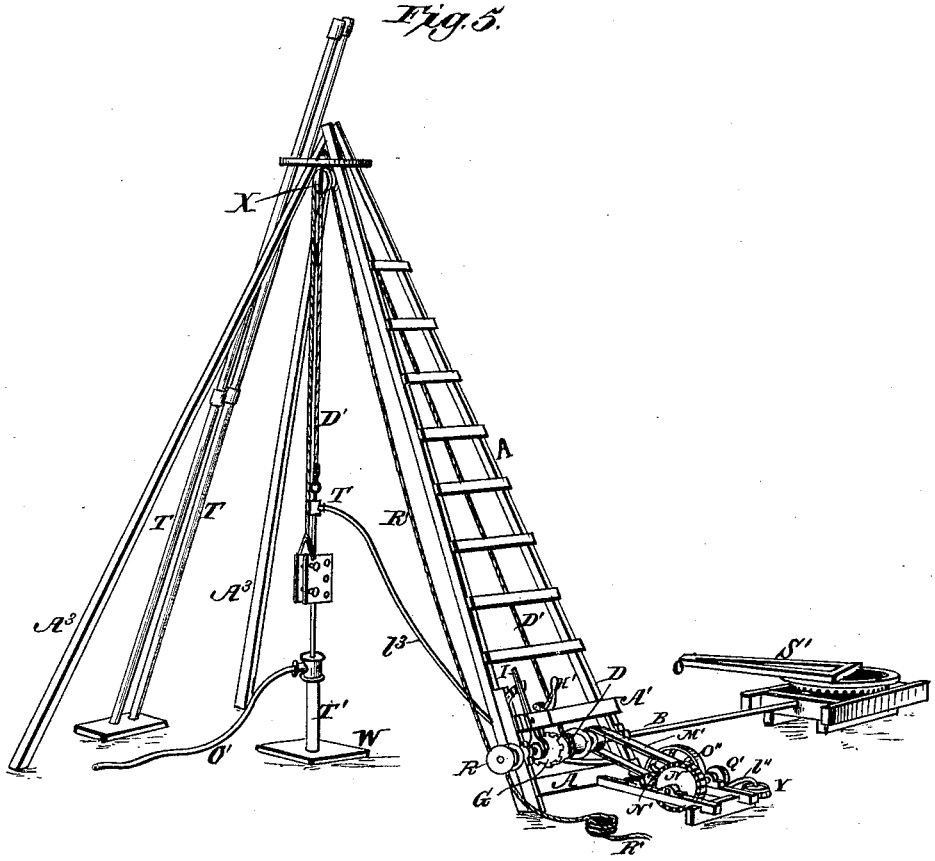
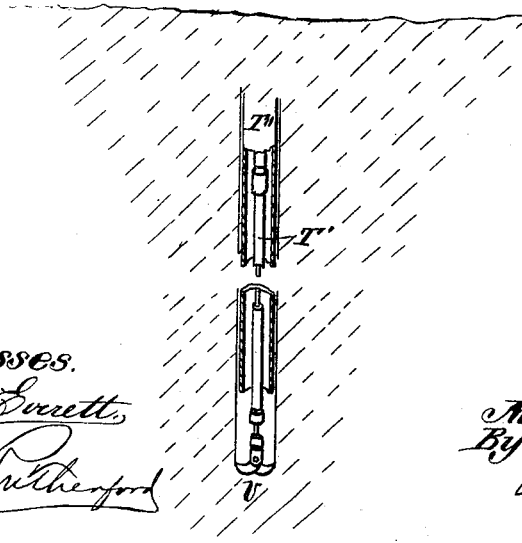
Witnesses.
Robert Everett,
J. A. Rutherford
Inventor:
Matthew T. Chapman,
By West & Bond,
Attys.

(No Model.) 6 Sheets—Sheet 5.

M. T. CHAPMAN.
WINDING DRUM.

No. 371,548. Patented Oct. 18, 1887.

Witnesses
Robert Everett
J. A. Rutherford

Inventor
Matthew T. Chapman
By West & Bond
Attys.

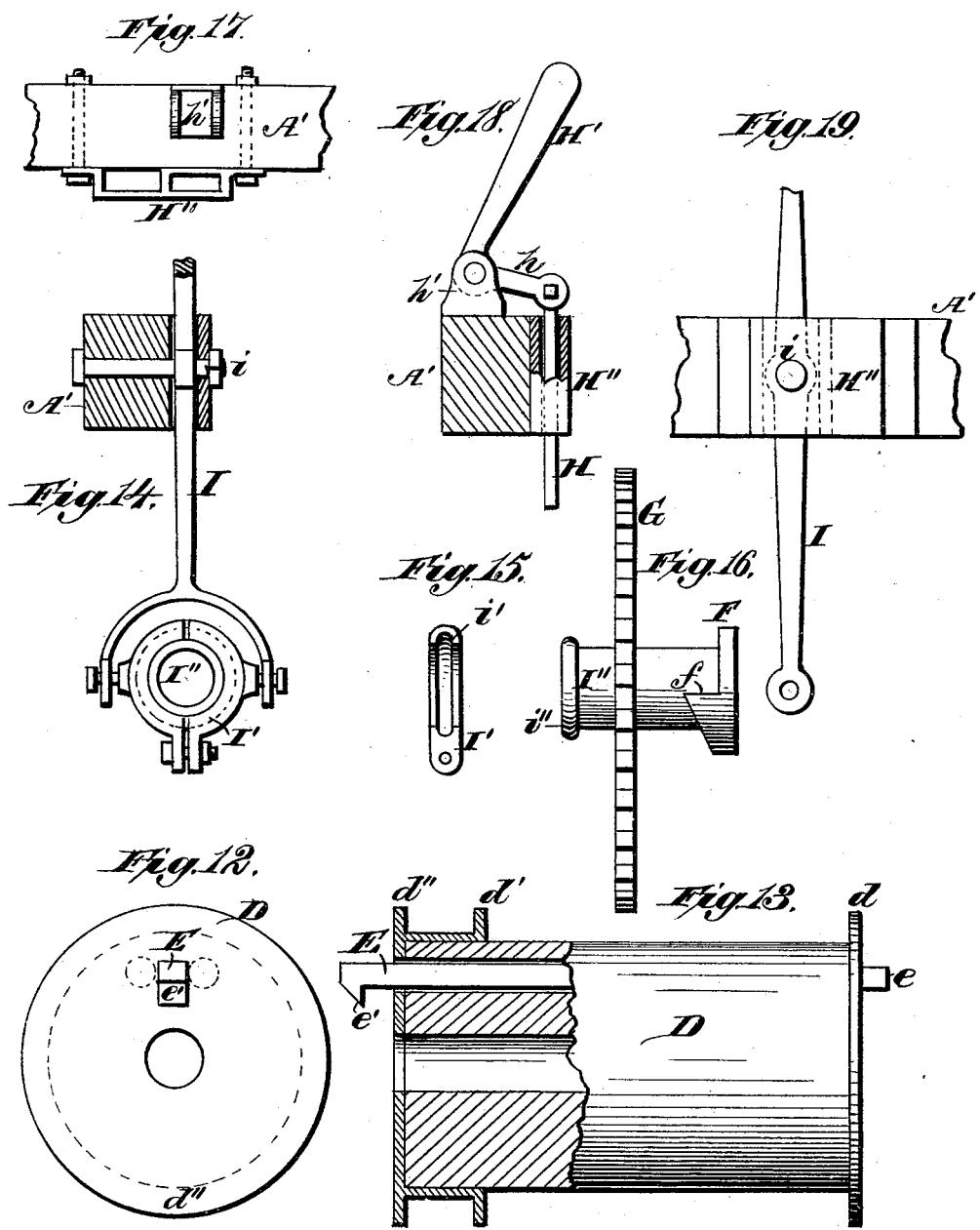

UNITED STATES PATENT OFFICE.

MATTHEW T. CHAPMAN, OF AURORA, ILLINOIS.

WINDING-DRUM.

SPECIFICATION forming part of Letters Patent No. 371,548, dated October 18, 1887.

Application filed October 30, 1885. Serial No. 181,385. (No model.)

*To all whom it may concern:*

Be it known that I, MATTHEW T. CHAPMAN, residing at Aurora, in the county of Kane and State of Illinois, and a citizen of the United States, have invented a new and useful Improvement in Winding-Drums, of which the following is a full description, reference being had to the accompanying drawings, in which—

Figure 6:
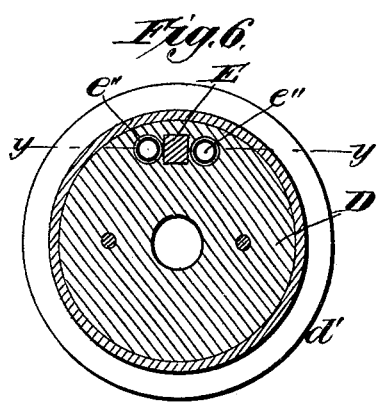
Figure 7:
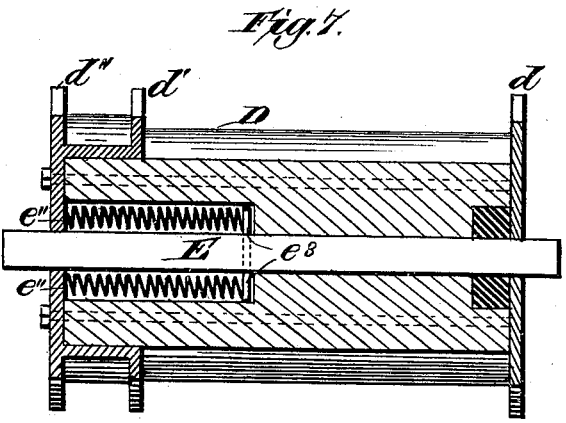
Figure 20:
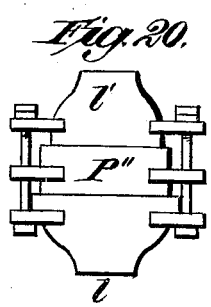
Figure 10:
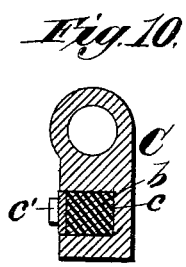
Figure 11:
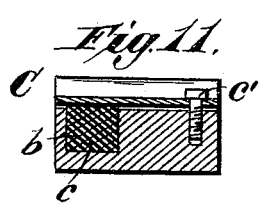
Figure 21:
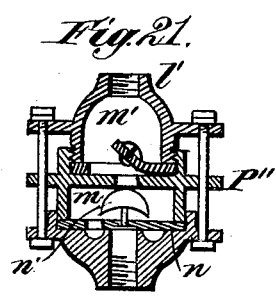
Figure 22:

Figure 1 is a front elevation with the power-balance removed; Fig. 2, a side elevation with the power-balance in place; Fig. 3, a top or plan view of Fig. 2; Fig. 4, a perspective view of Fig. 2. Fig. 5 shows the devices applied to use in connection with a drill rod and tubes for sinking a well; Fig. 6, a cross-section of the winding-drum on the line $x\ x$, Fig. 7; Fig. 7, a longitudinal section through the winding-drum on the line $y\ y$ of Fig. 6, showing the sliding catch; Figs. 8, 9, 10, and 11, details of the revolving block or head; Fig. 12, an end elevation of the drum; Fig. 13, a side elevation of the drum, partly in section; Figs. 14, 15, and 16, details of the unlocking-lever, the holding-disk, and the cam disk; Fig. 17, a detail showing a support for the unlocking-lever and the holding-latch; Fig. 18, a detail of the holding-latch and its lever; Fig. 19, a detail of the unlocking-lever; Figs. 20 and 21, an end elevation and a section of the pump-chamber; Fig. 22, a detail of the valves in the pump-chamber.

This invention relates to winding-drums and other devices primarily designed to be used in drilling and sinking holes for tube-wells, but which can be used in other places and for other purposes, and has for its objects to improve the devices for automatically engaging the winding-drum with or disengaging it from the driving-shaft; to prevent the recoil of the drum from injuring the drum and its driving devices; to graduate the speed of the unwinding to suit the force of the blow required for driving purposes and to hold the drum stationary when the tools are at rest; to prevent the backlash from the unwinding of the cable or rope from affecting the momentum or injuring the power, and to improve generally the construction and operation of the parts, as hereinafter more specifically described; and its nature consists in the several parts and combinations of parts hereinafter set forth, and pointed out in the claims as new.

In the drawings, A represents uprights or posts, which may be two of the posts of a derrick or supporting-posts of a suitable framework, and, as shown, the posts A at the bottom are tied together by a cross-piece, A', and a second cross-piece, A'', is provided above the cross-piece A', between which cross-pieces A' A'', as shown, are located the winding-drum and its actuating devices. The framework may be changed to suit the nature of the work for which the drum is used.

B is the driving-shaft, mounted, as shown, in suitable journal-boxes, B', secured to the side pieces A of the frame, and, as shown, this shaft extends to both sides of the frame, and to one end is connected the pitman or tumbling-rod of a horse or other power.

C is a head secured in any firm manner to the shaft B, the connection, as shown, being by means of set bolts or screws $a$. This head has a cylindrical portion fitting around the shaft, through which the bolts or set-screws pass, and has at one side an extension, $b$, having therein a recess, $b'$, in which recess is located a cushion, $c$, of india rubber or other yielding material, which cushion, as shown, is faced by a piece of steel or other hard material, $c'$. This bumper or cushion projects in the direction of the rotation of the head and forms a bumper, for a purpose hereinafter stated.

D is a winding-drum mounted loosely upon the shaft B in close proximity to the head C, and having at one end a flange or rim, $d$, and at the other end two flanges or rims, $d'\ d''$, between which is a space to receive a brake-band, and, as shown, the flange $d'$ is turned to form a surface around the drum for contact with the brake-band.

E is a sliding latch or bar extending longitudinally through the drum D, its length being somewhat longer than that of the drum, so that when advanced its end $e$ will project beyond the end of the drum and be engaged by the cushion $c$ and extension $b$, thus forming a connection between the head C and drum D, by which the drum will be rotated. The other end of the sliding catch or bar E is provided with a hook, $e'$, to engage with a cam for withdrawing the catch or bar, and the catch or bar is thrown into acting position by springs $e''$—one located, in the arrangement shown, on each side of the bar within the drum—one end of each spring engaging the face of the plate $d''$, and the other end engaging a pin, $e^3$, passing through the bar or catch, and, as shown, the body of the bar or catch is flat its entire length, but could be round in cross section for a portion of its length, and the springs $e''$ are located in holes formed in the drum on each side of the bar, as shown in Figs. 6 and 7.

F represents a disk loosely mounted upon the shaft B adjacent to the end of the drum, and having a circular periphery of such diameter that the bar or catch E will pass around without coming in contact with the periphery of the disk. This disk has its edge between the end face of the drum and the face of the catch or projection $e'$, and is provided with an inclined projection, $f$, over which the catch $e'$ rides with the rotation of the drum, thus withdrawing the catch or bar E, so that its end $e$ will clear the extension $b$, leaving the head C free to rotate without imparting rotation to the drum. The length of the incline $f$, over which the end $e'$ rides, is sufficient to hold the catch or bar E withdrawn until its end $e$ has passed the width of the extension $b$, and as the catch $e'$ passes from the incline $f$ the springs $e''$ act to advance the catch or bar to bring the end $e$ in position to be caught and engaged by the cushion $c$ and extension $b$. In effect the disk F is a cam-disk for withdrawing the bar or catch E.

G is a circular plate loosely mounted on the shaft B, and having its periphery provided with a series of notches, $g$, and this plate is connected with the cam-disk F by a hub or collar, F′, so that the plate and cam-disk can be moved together forward and back on the shaft B.

H is a latch located over the plate G and supported in a guide box or plate, H″, so as to be free to slide up and down. This latch at its upper end is pivoted to ears $h$ on the end of a lever, H′, which lever is pivotally mounted in supports $h'$ on the top of the cross-bar A″, so that by moving the lever the latch H can be withdrawn from or forced into engagement with the notches $g$ of the plate G to hold such plate stationary and adjust the relation of the incline $f$ to the withdrawal of the latch or bar E, to regulate the unwinding of the rope by increasing or decreasing the traveling-space of the extension $b$ in relation to the position of the incline $f$. The casing or box H″, as shown, is bolted to the cross-bar A″, on which the latch H is mounted; but the latch and its support and operating-lever can be located in some other relation than a vertical one to the plate G, so long as such parts will allow the latch to be forced into or withdrawn from engagement with the notches $g$ for holding and adjusting the plate in its relation to the drum.

I is a lever pivoted, as shown, between the box or casing H″ and the side face of the cross-bar A″, the lower end of which lever is provided with a fork, I′, to encircle a collar or ring, I″, connected with the plate G, so that by swinging the lever I endwise on its pivot or bolt $i$ the plate G and cam-disk F can be withdrawn from the end face of the drum D a sufficient distance to withdraw the latch or catch E and maintain it in position to have its end $e$ clear the extension $b$, leaving the head C free to revolve continuously without revolving the drum, and, as shown, the lever I is maintained in position to hold the plate G and cam-disk F in either an advanced or withdrawn position in relation to the drum by a rack, $1^3$, attached to the side piece A.

J is a brake-band encircling, as shown, the under side of the drum D, and having one end secured to the cross-piece A″ by a pin or bolt, $j$, passing through ears $j'$, attached to such cross-piece, and having its other end attached by a pin or bolt, $j''$, to the end J′ of a lever, J″, such lever being pivotally mounted in ears $j^3$ on the top of the cross-bar A″ and carrying at its free end an adjustable weight, $J^3$, by which the pressure of the brake-band on the drum can be regulated. The brake-band is located, as shown, between the flanges $d'$ $d''$, and by adjusting the weight forward or back on the lever an increased or decreased blow of the driving-block will be had. The farther forward the weight is adjusted the less is the pressure exerted by the brake-band on the drum, and consequently the drum is more free to revolve, and the greater the speed of the drum the greater the force of the blow struck. The lever can also be used with hand-power to tighten the brake-band on the drum and to stop the drum when required for any purpose.

K represents side pieces, and K′ K″ end pieces, forming a frame-work for the balance devices of the shaft B, which frame is hinged to the cross-piece A′ by hooks $k'$, secured to the end piece K′, which enter eyes $k$ on the cross-piece A′, or in any other suitable manner that will leave the frame K K′ K″ free to rise and fall at its unattached end.

L is a shaft mounted in suitable journal-boxes, L′, on the side pieces K.

M is a pulley secured to the shaft L so as to revolve therewith, over which pulley M a belt, M′, runs to a pulley, M″, on the shaft B, the pulley M″ being driven by the shaft B, and, through the belt M′, driving the pulley M and shaft L.

N is a gear-wheel secured to the shaft L, so as to be driven thereby.

O is a shaft mounted in suitable bearings, O′, on the side pieces K, and having secured thereto a fly-wheel, O″, for maintaining the momentum, as usual in power-driven machinery, and on this shaft O is secured a small gear, N′, which meshes with the large gear N and drives the shaft O and fly-wheel O″.

P is a pump-cylinder secured in any firm manner to one of the side pieces K, in which cylinder a plunger or piston, P′, is worked; the cylinder being provided at the end with an inlet and outlet chamber, P″, which chamber on one side is provided with an inlet-port, $l$, controlled by a suitable valve, and having attached thereto a pipe or hose, $l''$, leading to a water-supply, through which inlet $l$ water is received into the chamber P'' and cylinder P by the withdrawal of the piston or plunger P', and the chamber P'' is provided with an outlet-port, $l'$, controlled by a suitable valve, and having attached thereto a hose or pipe, $l^3$, leading to the tubing to be sunk when the apparatus is used in sinking a tube-well, and through which port and hose water is forced into the well-tubing from the cylinder P and chamber P'' on the advance of the piston or plunger P'. The valve for the outlet-port is closed when water is drawn in, and the valve for the inlet-port closed when the water is forced out, as usual.

Q is a piston-rod attached at one end to the piston or plunger P, and extending back and attached to a crank-pin, Q'', on a disk, Q', which disk is securely fastened to the end of the shaft L, which projects beyond the side piece K for this purpose, by which means the same power that drives the shaft B also operates the pump.

R is a spool mounted on the shaft B, and keyed or otherwise fastened thereto, so as to revolve therewith, which spool receives a rope or cable, when the apparatus is used for sinking tube-wells, to lift the tubing when required.

S is a shaft or tumbling-rod of a horse power, S', which can be used for driving the devices, or some other motive power can be used for this purpose.

The operation of the drum and its controlling devices is as follows: Power is applied to the shaft B from a horse-power or other suitable motor, rotating such shaft, and the rotation of the shaft carries with it the head C, which is keyed thereto, and this head, as it rotates, brings the cushion $c$ and extension $b$ into contact with the end $e$ of the bar or catch E when such end is extended, as shown in Fig. 1, locking the drum D to the head C and giving rotation to the drum, by which the cable D' will be wound up thereon, until the catch or bar E is withdrawn by the engagement of the cam-disk F with the end $e'$ thereof, withdrawing the end $e$ and leaving the drum loose on the shaft and free to have a reverse rotation given thereto by the unwinding of the rope D' from the drum by weight of the driving-block or other device which the rope or cable D' carries. The length of the wind and unwind of the rope or cable D' on the drum D is controlled by the relative positions of the incline $f$ to the point of engagement of the head C with the drum—that is, for an increased wind, the cam-disk F is set to have it operate on the latch E to release the drum from the revolving head C at a point farther forward than where the last release was, which is done by turning the cam-disk in the direction of the rotation, so that the head will have to rotate that much farther in order to bring the end of the latch E into engagement with the incline F to effect the release, and to decrease the wind the cam is turned in the reverse direction to that of the rotation, which causes a release at a point in advance—it being understood that with each revolution of the head a disengagement of the latch E occurs, and it will be seen that with the increase of the wind there is a decrease of the unwind on the first revolution as the drum and head are brought into engagement before the drum has discharged the full amount of the wind previously made, and in each decrease of the wind there is an increase in the unwind on the first revolution, as the drum and head are not brought into engagement until the drum has reversed itself a greater distance than one revolution, and this increase and decrease in the wind and unwind of the rope D' will be proportionate to the distance the cam-disk F has been advanced or receded in relation to the point where the prior disengagement was produced, there being in one case an increased rotation of the drum before the unlocking occurs and in the other case a decreased rotation before the engagement is made. The cam-disk is changed in relation to the point of disengagement by the operator taking hold of the lever H' and raising the dog or latch H from engagement with the notch of the plate G and then turning such plate forward or back, as required for an increase or decrease in the wind, and, when the proper adjustment is had, again locking the plate G and cam-disk F stationary by engaging the end of the latch or dog H with the notch $g$ in line therewith. The drum can be left free to unwind continuously without engagement at each revolution of the shaft B and head C by the operator throwing the lever I to withdraw the plate G and cam F from their normal relation to the drum D when tripping, which withdrawal of the cam-disk F withdraws the latch or catch E and maintains it in position so that the end $e$ will pass the cushion $c$ and extension $b$, and the drum can be made to wind continuously by withdrawing the latch or dog H from its engagement with the notch of the plate G and keeping it out of engagement, which allows the cam-disk and plate G to rotate with the drum by the engagement of the end $e$ with the incline $f$, and for this purpose the connection of the lever I with the plate G is made by having the encircling box I' made in two parts, each part having a semicircular groove, $i'$, to receive a bead, $i''$, on the end of the hub or center of the plate G, by which means a connection for the lever with the plate is furnished, by which the plate G and cam-disk F can be moved endwise, and at the same time the plate and disk are free to revolve with the shaft B when locked to the drum D. This drum and its controlling devices for increasing or decreasing the winding at pleasure can be used for any purpose where the rotation and release of a drum are desired, so as to wind or unwind a rope or cable automatically at stated intervals.

The drum can be stopped and held stationary by withdrawing the catch E through the withdrawal of the cam disk and then applying the brake-band J through the lever J', and in use the speed of the reverse rotation of the drum D is regulated by adjusting the weight $J^3$ forward or back on the end of the lever J'', to increase or decrease the pressure of the brake-band on the drum. The nearer the free end of the lever the weight is adjusted the greater the pressure and the less the speed of the drum, and the effects of the recoil in the engagement of the head C with the drum D is overcome by the cushion c, which yields and receives the effect of the blow of the contact without imparting the force of the contact to either the drum or the head, thus preventing injurious effects when the engagement is made.

The backlash consequent upon the checking of the increased speed of the shaft by the engagement of the head C with the drum D and any consequent ill effects therefrom are overcome by the balance-frame carrying the fly-wheel, which frame and the devices carried thereby also act as a belt-tightener. The speed of the shaft is increased when the drum D is released, as the power then carries the shaft and head C only, and this increase in speed is accumulated in the fly wheel by passing from the pulley M'', through the belt M', to the pulley M, and thence through the shaft L, gear-wheels N N', and shaft O to the fly-wheel, and this accumulation of the momentum enables the machine to overcome the resistance of the drum and the devices operated therefrom without any loss of power, as the increased momentum carried by the fly-wheel is transmitted back through the same devices to the shaft B and head C, and at the same time the belt furnishes a flexible connection which receives the force of the engagement without imparting any jerk to the power or producing any jar of the machinery that will cause injurious effects.

Fig. 5 shows the winding-drum and its devices and the power-balance used in connection with devices for sinking a well, and in this figure T represents a hollow drill-rod, to which water is supplied through the hose $l^3$ from the pump P. This rod, as shown, is located in a tube, T', which is being sunk, and, as shown, this tube T' is in a casing or outer tube, T'', which has been sunk, and the well is being completed by sinking the tubing T' still deeper; but in practice the well is to be sunk according to the nature of the ground through which it passes, either with both tubes T' T'' or without either one, and, as shown, the tubes T' T'' form the wall of the well. U is an expansion-drill attached to the lower end of the drill-rod T for boring the hole for the tubing; V, a driving-block carried by the rope R' for the purpose of forcing down the tubing when necessary, the drill-rod T being carried by the rope D', which runs to the drum D, and the rope R' runs to the spool R; W, a board or platform located around the tubing for the workmen to stand upon, and also forming a guide for the tubing; X, a sheave provided with pulley-wheels, over which the ropes D' and R' run.

In use the drill-rod T is raised with the advance rotation of the drum D, and as the catch of the drum is released the weight of the rod and the drill or other tool which it carries causes a reverse rotation of the drum, unwinding the rope therefrom and allowing the drill to drop to the bottom of the hole and do its work, the drill in the arrangement shown, after striking, being turned by the operator, and this drill, as the drum again rotates in a forward direction, is raised and again released, and so on until the work is finished, and the amount of drop of the rod and drill is regulated by adjusting the cam-disk F to produce a greater or less winding and unwinding, each revolution of the drum raising and dropping the drill-rod and its attachment, and in case the tube being sunk becomes stuck or does not descend as it should an operator can take hold of the rope R' and raise the block or hammer V, and allow it to descend to force the tubing down, and during the operation of drilling the pump P P' P'', which is operated by the crank disk or wheel Q', forces water through the pipe $l^3$ to supply the water to the drill, as required, and this drill may be a self-lift by which the water and other material produced in the drilling is carried to the top, or any other kind of a drill adapted to sink a well. The water-supply for the pump is taken in the arrangement shown from a barrel, Y, through a hose, l', which leads to the port l of the receiving-chamber P'', and, as shown in Figs. 20 and 21, this chamber is made up of three parts, so as to form a chamber, m, and a chamber, m', the chamber m being the receiving one and the chamber m' the discharging one, and the inlet-port l in the chamber m is controlled by a flap-valve, n, as is also the port leading into the discharge-chamber m', which valves are made, as shown in Fig. 22, by a circular disk with the center cut out to leave a flap, n', which flap is loaded, and the disks n are slipped between the edges of the parts forming the chamber P'', as shown in Fig. 21, so that when the parts are brought together the disks also furnish the packing for the chambers m m'.

As shown, the upper end of the tube T' is provided with a chamber, o, from which a hose, o', leads to conduct the water from the drill-tube when used as a pump-tube onto the surface of the ground.

Figure 8:
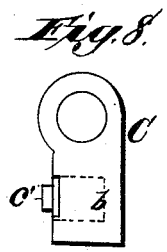
Figure 9:
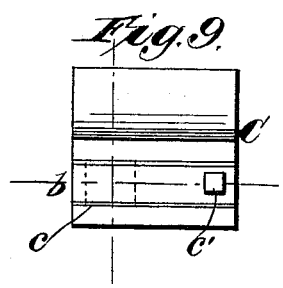

As shown in Figs. 8 and 9, the bumper or cushion is in the revolving head; but such bumper or cushion might be formed by locating rubber or other elastic material, c'', on each side of the sliding latch, as shown in Fig. 7, to form the cushion, in which case the bumper could be omitted from the revolving head C and the extension b be left entire to engage the end e of the latch, or the cushion or bumper might be placed in both the drum and the head.

The power-balance being hinged or pivotally attached to the frame, it will be seen that its outer end is free to rise and fall, and this freedom of movement prevents the backward blow produced by the return of the drum from injuring the parts, as with the ordinary blow the loose end will be thrown up, and an increase in the blow will simply throw the loose end still higher, and this rising of the free or outer end loosens the belt, allowing it to slip on the pulleys, thereby preventing the transmission of the blow to the parts.

What I claim as new, and desire to secure by Letters Patent, is—

1. The shaft B and head C, carrying an extension, $b$, and cushion $c$, in combination with a loose winding-drum and a sliding catch or bar, substantially as specified.

2. A loose winding-drum carrying a sliding latch or bar, in combination with a cushioning device carried by the power-imparting device for preventing any injurious effects from the recoil, substantially as specified.

3. A loose winding-drum carrying a sliding catch or bar, in combination with a cam or disk and a rotating head for engaging and disengaging the drum with its driving-shaft, substantially as specified.

4. A loose winding-drum carrying a sliding catch or bar, in combination with a sliding cam-disk and a notched plate for withdrawing the sliding catch or bar, substantially as and for the purpose specified.

5. The combination, with a loose winding-drum carrying a sliding catch or bar and a rotating head to engage the catch or bar, of a sliding cam-disk and notched plate or latch therefor for changing the rotation of the drum in winding or unwinding, substantially as and for the purpose specified.

6. The combination of a loose winding-drum having a latch, a revolving head adapted to engage said latch, a releasing-cam, a brake-band, and a weighted lever for operating said band and changing the speed of the drum, substantially as described.

7. The combination, with a loose winding-drum, of a revolving carrying-head, a sliding catch, a releasing cam-disk, and a brake-band operated by a weighted lever for automatically operating the drum to wind and unwind with an increased or decreased speed, substantially as and for the purposes specified.

8. The combination, with a driving-shaft and a loose winding-drum, of a power-balance operating to accumulate the amount gained when the drum is unwinding and prevent injurious effects, and a swinging frame or support for said power-balance, substantially as and for the purpose specified.

9. The combination, with a driving-shaft, a fly-wheel, and a loose winding-drum, of pulleys M M″, belt M′, a swinging frame or support for the fly-wheel, and devices for transmitting momentum to the fly-wheel and preventing injurious effects in starting the drum, substantially as specified.

10. The combination, with a driving-shaft and a loose winding-drum, of the pulleys M M″, belt M′, shafts L O, gears N N′, and fly-wheel O″, for accumulating the momentum when the drum is running loose, substantially as and for the purpose specified.

11. The shaft B and head C, carrying an extension, $b$, and cushion $c$, in combination with a loose winding-drum and an engaging catch or stop, substantially as specified.

12. A loose winding-drum carrying an engaging latch or stop, in combination with a cushioning device carried by the power-imparting device for preventing any injurious effects from the recoil, substantially as specified.

13. The combination, with a fly-wheel and a loose winding-drum, of a hinged balance acting as a belt-tightener and adapted to receive the force produced when the winding-drum is released, and thereby prevent injury to the drum and its connections, substantially as described.

MATTHEW T. CHAPMAN.

Witnesses:
ALBERT H. ADAMS,
O. W. BOND.